(12) United States Patent
Wayne et al.

(10) Patent No.: US 11,099,862 B1
(45) Date of Patent: Aug. 24, 2021

(54) INTERFACE TO CONFIGURE MEDIA CONTENT

(71) Applicant: Snap Inc., Santa Monica, CA (US)

(72) Inventors: Ashley Michelle Wayne, Los Angeles, CA (US); Giovanni Gardelli, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/206,742

(22) Filed: Nov. 30, 2018

(51) Int. Cl.
| G06F 3/0482 | (2013.01) |
| G06F 9/451 | (2018.01) |
| G06T 7/90 | (2017.01) |
| G06F 3/0484 | (2013.01) |
| H04W 4/021 | (2018.01) |
| G06F 3/0481 | (2013.01) |
| G06F 40/109 | (2020.01) |

(52) U.S. Cl.
CPC ............ *G06F 9/451* (2018.02); *G06F 3/0482* (2013.01); *G06F 3/04817* (2013.01); *G06F 3/04842* (2013.01); *G06F 3/04845* (2013.01); *G06F 40/109* (2020.01); *G06T 7/90* (2017.01); *H04W 4/021* (2013.01)

(58) Field of Classification Search
CPC .................................................... G06F 3/0482
USPC ......................................................... 715/762
See application file for complete search history.

(56) References Cited

U.S. PATENT DOCUMENTS

| 8,990,288 B2* | 3/2015 | Hendrey ................. G06F 16/29 709/203 |
| 10,217,488 B1* | 2/2019 | Huang ................. H04N 5/2628 |
| 10,382,373 B1* | 8/2019 | Yang .................. G06K 9/00684 |
| 2003/0174174 A1* | 9/2003 | Fitzpatrick ............ G06F 3/0482 715/809 |
| 2004/0117358 A1* | 6/2004 | von Kaenel ........... G06Q 40/08 |
| 2007/0036371 A1* | 2/2007 | Buil ..................... G06F 16/5838 381/312 |
| 2008/0138030 A1* | 6/2008 | Bryan ................ H04N 21/4221 386/343 |
| 2009/0309894 A1* | 12/2009 | Lam ...................... G06F 40/103 345/582 |
| 2010/0107062 A1* | 4/2010 | Bacus ................... G06F 40/106 715/269 |
| 2010/0182618 A1* | 7/2010 | Akiyama ................. H04N 1/40 358/1.9 |
| 2010/0246950 A1* | 9/2010 | De Kruif ................. H04N 9/67 382/167 |
| 2010/0275161 A1* | 10/2010 | DiCamillo ............ G06F 40/103 715/810 |

(Continued)

*Primary Examiner* — Daniel Rodriguez
(74) *Attorney, Agent, or Firm* — Schwegman Lundberg & Woessner, P.A.

(57) ABSTRACT

Embodiments of the present disclosure relate to systems for performing operations that include: receiving a first media object, such as a digital representation of a logo (e.g., JPEG, TIFF, PNG, BMP, etc.), wherein the first media object comprises at least color data that defines a set of colors of the media object; detecting the set of colors of the first media object responsive to receiving the first media object; selecting a portion of the set of colors of the first media object; and generating an interface to configure a second media object, the interface comprising a display of one or more configuration options that include a color selection, the color selection comprising a presentation of the portion of the set of colors.

15 Claims, 12 Drawing Sheets

(56) References Cited

U.S. PATENT DOCUMENTS

| | | | | |
|---|---|---|---|---|
| 2012/0225672 A1* | 9/2012 | Tholkes | ................. | H04W 4/02 |
| | | | | 455/456.3 |
| 2013/0335335 A1* | 12/2013 | Neelakant | ........... | G06F 3/04883 |
| | | | | 345/173 |
| 2014/0162243 A1* | 6/2014 | Lamkin | .................... | G09B 7/02 |
| | | | | 434/365 |
| 2014/0215362 A1* | 7/2014 | Barros | ................ | G06F 3/04817 |
| | | | | 715/763 |
| 2014/0379317 A1* | 12/2014 | Sanden | ................ | G01V 99/005 |
| | | | | 703/10 |
| 2014/0380229 A1* | 12/2014 | Volodin | ................ | G06F 3/0482 |
| | | | | 715/780 |
| 2015/0019595 A1* | 1/2015 | Kritt | .................... | G06F 40/103 |
| | | | | 707/809 |
| 2015/0149317 A1* | 5/2015 | Marschke | .......... | G06Q 30/0643 |
| | | | | 705/26.5 |
| 2015/0153927 A1* | 6/2015 | Kashibuchi | ........... | G06F 3/0488 |
| | | | | 345/173 |
| 2015/0301989 A1* | 10/2015 | Xin | ....................... | G06F 40/109 |
| | | | | 715/234 |
| 2016/0133030 A1* | 5/2016 | Manuja | ................ | G06T 11/001 |
| | | | | 345/594 |
| 2016/0246491 A1* | 8/2016 | Wu | ..................... | G06F 3/04847 |
| 2017/0004113 A1* | 1/2017 | Gore | .................... | G06F 3/0482 |
| 2017/0132822 A1* | 5/2017 | Marschke | ............. | G06F 3/0482 |
| 2017/0206003 A1* | 7/2017 | Paek | .................. | G06F 3/04842 |
| 2018/0136827 A1* | 5/2018 | Bae | .................... | G06F 3/04845 |
| 2018/0176730 A1* | 6/2018 | Szymczyk | ........... | H04W 4/022 |
| 2018/0246983 A1* | 8/2018 | Rathod | ............... | G06F 16/9535 |
| 2018/0350144 A1* | 12/2018 | Rathod | ............... | G06Q 20/3276 |
| 2019/0020983 A1* | 1/2019 | Thompson | ............ | H04W 4/021 |
| 2019/0090085 A1* | 3/2019 | Masterson | ............ | H04W 4/023 |
| 2019/0281410 A1* | 9/2019 | Ahmed | ................ | H04L 67/18 |

* cited by examiner

400

RECEIVING A FIRST MEDIA OBJECT THAT COMPRISES AT LEAST COLOR DATA THAT DEFINES A SET OF COLORS OF THE MEDIA OBJECT
402

DETECTING THE SET OF COLORS OF THE FIRST MEDIA OBJECT RESPONSIVE TO THE RECEIVING THE FIRST MEDIA OBJECT
404

SELECTING A PORTION OF THE SET OF COLORS, THE PORTION OF THE SET OF COLORS COMPRISING ONE OR MORE COLORS FROM AMONG THE SET OF COLORS
406

GENERATING AN INTERFACE TO CONFIGURE A SECOND MEDIA OBJECT, THE INTERFACE COMPRISING A DISPLAY OF ONE OR MORE CONFIGURATION OPTIONS THAT INCLUDE A COLOR SELECTION, THE COLOR SELECTION COMPRISING A PRESENTATION OF THE PORTION OF THE SET OF COLORS
408

DETERMINING A PIXEL COUNT OF EACH COLOR FROM AMONG THE SET OF COLORS
502

RANKING THE SET OF COLORS BASED ON THE PIXEL COUNT OF EACH COLOR FROM AMONG THE SET OF COLORS
504

SELECTING A PORTION OF THE SET OF COLORS BASED ON THE RANKING
506

```
┌─────────────────────────────────────────────────────┐
│     IDENTIFYING A FONT OF THE FIRST MEDIA OBJECT    │
│                         602                         │
└─────────────────────────────────────────────────────┘
                           │
                           ▼
┌─────────────────────────────────────────────────────┐
│ CAUSING DISPLAY OF A TEXT SELECTION MENU WITHIN THE │
│ INTERFACE TO CONFIGURE THE SECOND DATA OBJECT, THE  │
│ TEXT SELECTION MENU COMPRISING A LIST OF FONTS, THE │
│ LIST OF FONTS INCLUDING AT LEAST THE FONT OF THE    │
│                 FIRST MEDIA OBJECT                  │
│                         604                         │
└─────────────────────────────────────────────────────┘
```

RECEIVING A USER INPUT THAT SELECTS A COLOR FROM AMONG THE PRESENTATION OF THE PORTION OF THE SET OF COLORS
702

CONFIGURING THE SECOND MEDIA OBJECT BASED ON THE COLOR SELECTED BY THE USER INPUT
704

*FIG. 7*

```
                    ┌──────────────────────────────────────────────────────┐
                    │ DETERMINE A LOCATION ASSOCIATED WITH THE FIRST       │
                    │ MEDIA OBJECT                                         │
                    │                        802                           │
                    └──────────────────────────────────────────────────────┘
                                              │
                                              ▼
                    ┌──────────────────────────────────────────────────────┐
                    │ CAUSING DISPLAY OF A MAP IMAGE THAT INCLUDES A       │
                    │ DEPICTION OF THE LOCATION ASSOCIATED WITH THE        │
                    │ FIRST MEDIA OBJECT                                   │
                    │                        804                           │
                    └──────────────────────────────────────────────────────┘
                                              │
                                              ▼
                    ┌──────────────────────────────────────────────────────┐
                    │ RECEIVING A USER INPUT THAT COMPRISES A SELECTION    │
                    │ OF AN AREA WITHIN THE MAP IMAGE                      │
                    │                        806                           │
                    └──────────────────────────────────────────────────────┘
                                              │
                                              ▼
                    ┌──────────────────────────────────────────────────────┐
                    │ ASSIGNING THE SECOND MEDIA OBJECT TO A GEO-FENCE     │
                    │ THAT ENCOMPASSES THE AREA                            │
                    │                        808                           │
                    └──────────────────────────────────────────────────────┘
```

INTERFACE TO CONFIGURE MEDIA CONTENT

TECHNICAL FIELD

Embodiments of the present disclosure relate generally to graphical user interfaces (GUI), and more particularly, to systems for generating and causing display of GUIs.

BACKGROUND

Media content is typically created with the goal of having the content viewed or otherwise received by a target audience. The target audience could for example be a specific subset of people, defined by a particular attribute, or could include be all people at a specific location. Various systems currently exist to enable advertisers to create and distribute such content. While these systems do provide the functionality necessary to create such media content, the amount of user interaction required varies greatly. For example, some systems may provide advanced graphic design interfaces that require a significant amount of user skill and training, while others are simplified for ease of use at the compromise of functionality.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for generating a graphical user interface to configure media content, according to certain example embodiments.

FIG. 5 is a flowchart illustrating a method for generating a graphical user interface to configure media content, according to certain example embodiments.

FIG. 6 is a flowchart illustrating a method for generating a graphical user interface to configure media content, according to certain example embodiments.

FIG. 7 is a flowchart illustrating a method for generating a graphical user interface to configure media content, according to certain example embodiments.

FIG. 8 is a flowchart illustrating a method for generating a graphical user interface to configure media content, according to certain example embodiments.

FIG. 9 is an interface diagram depicting a graphical user interface to configure media content, according to certain example embodiments.

DETAILED DESCRIPTION

Figure 1:
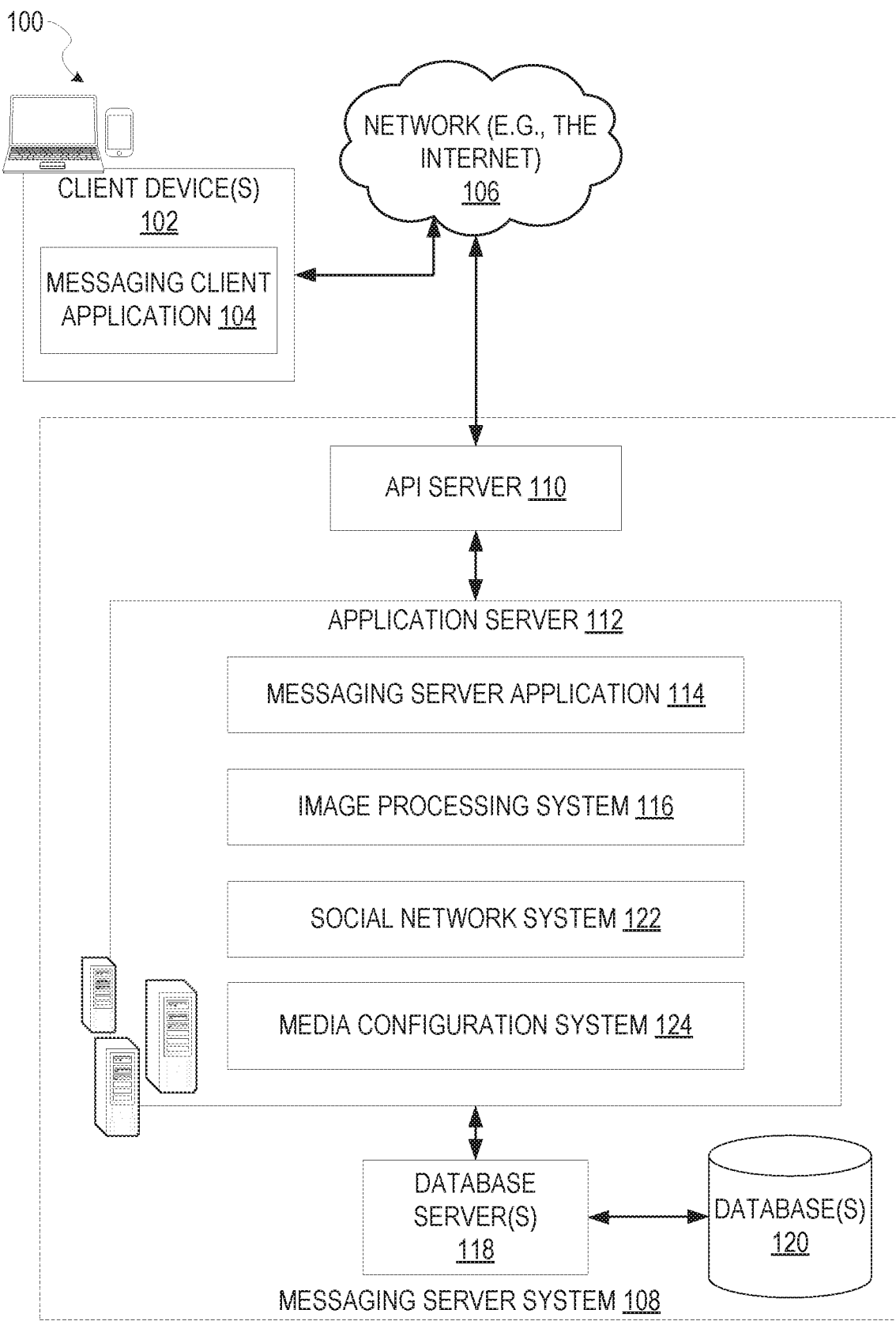
FIG. 1 is a block diagram showing an example messaging system for exchanging data (e.g., messages and associated content) over a network in accordance with some embodiments, wherein the messaging system includes a media configuration system.

Advertisers often need to create brand-specific media content to distribute to a population of users. Existing systems in place for creating such content requires significant user involvement. For example, a graphic designer may need to create a customized logo based on colors identified by an advertiser, and then prepare drafts to be reviewed and selected by the advertiser. As a result of custom nature of the media content, the process of creating the media content is both time consuming, and expensive. For example, current systems for creating such content (e.g., Adobe Illustrator), require a high level of user skill and advertiser involvement to provide inputs identifying colors, patterns, fonts, as well as overall design themes. A simplified system to enable an advertiser to quickly prepare and review media content for immediate distribution would therefore be beneficial.

The system disclosed below provides a method to generate and review media content by performing operations for receiving a first media object, wherein the first media object may for example include a logo or design uploaded by an advertiser, identify one or more colors that are included in the logo, select a portion of the one or more colors, and generate and cause display of a media content configuration interface to configure second media object, wherein the media content configuration interface comprises a display of one or more configuration options, wherein the configuration options are based on (among other things) the portion of the one or more colors detected in the first media object.

For example, a user (e.g., an advertiser) may upload a digital logo. In response to receiving the digital logo, a media configuration system detects colors in the logo, and ranks the colors of the logo based on their corresponding prominence in the logo. In some embodiments, to rank the colors of the logo the media configuration system determines pixel counts of each color, and then ranks each color based on their corresponding pixel counts. The media configuration system determines the top colors based on the ranking (e.g., top 3, top 10%), and presents the top colors as selectable options in the interface.

In some embodiments, the first media object uploaded to the media configuration system includes text data that identifies a font associated with the first media object. Responsive to receiving the first media object, the media configuration system identifies the font of the first media object, and causes display of a set of font options in the interface, wherein the font options are presented as a list that includes the font of the first media object.

In some embodiments, the media configuration system may cause display of a set of content templates, wherein each content template comprises a set of user interface elements that may be customized and displayed on the fly based on selections of the user. For example, responsive to receive a selection of a color or font, the media configuration system may update the display of the set of content templates in real-time. The user may review the templates before making a selection of a template for use in creating media content.

Therefore, a system to generate and cause display of an interface to configure media content is described. Embodiments of the present disclosure relate to systems for performing operations that include: receiving a first media object, such as a digital representation of a logo (e.g., JPEG, TIFF, PNG. BMP, etc.), wherein the first media object comprises at least color data that defines a set of colors of the media object; detecting the set of colors of the first media object responsive to receiving the first media object; selecting a portion of the set of colors of the first media object; and generating an interface to configure a second media object, the interface comprising a display of one or more configuration options that include a color selection, the color selection comprising a presentation of the portion of the set of colors.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a media configuration system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following." and also the identification of other entities and interests of a particular user.

The application server 112 is communicatively coupled to a database server 118, which facilitates access to a database 120 in which is stored data associated with messages processed by the messaging server application 114.

Figure 2:
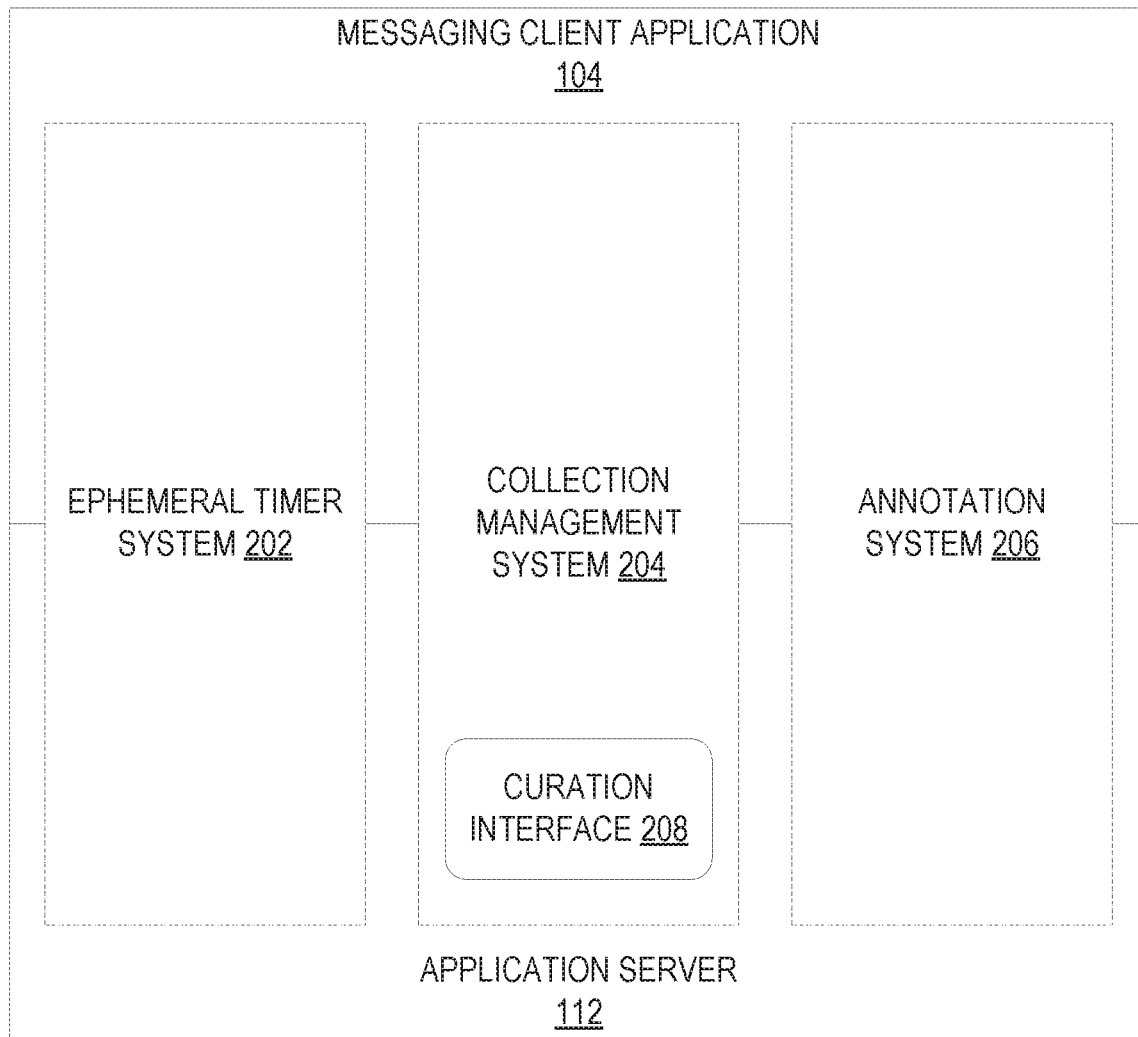
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
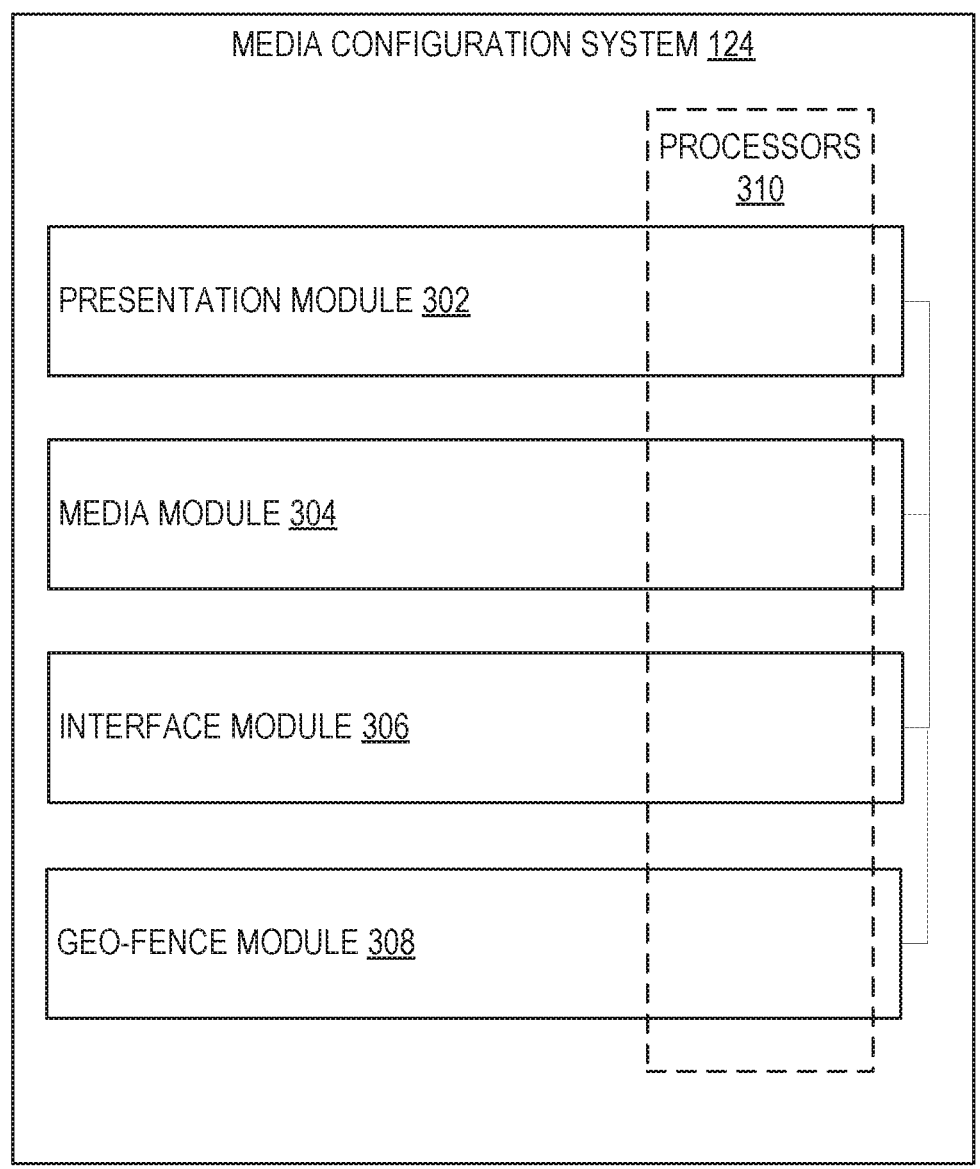
FIG. 3 is a block diagram illustrating various modules of a media configuration system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the media configuration system 124 that configure the media configuration system 124 to generate and cause display of an interface to configure media content, according to some example embodiments. The media configuration system 124 is show as including a presentation module 302, a media module 304, an interface module 306, and a geo-fence module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the media configuration system 124 may physically include an arrangement of one or more of the processors 310 (e.g., a subset of or among the one or more processors of the machine) configured to perform the operations described herein for that module. As another example, any module of the media configuration system 124 may include software, hardware, or both, that configure an arrangement of one or more processors 310 (e.g., among the one or more processors of the machine) to perform the operations described herein for that module. Accordingly, different modules of the media configuration system 124 may include and configure different arrangements of such processors 310 or a single arrangement of such processors 310 at different points in time. Moreover, any two or more modules of the media configuration system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for generating a graphical user interface to configure media content, according to certain example embodiments. Operations of the method 400 may be performed by the modules described above with respect to FIG. 3. As shown in FIG. 4, the method 400 includes one or more operations 402, 404, 406, and 408.

At operation 402, the media module 304 receives a first media object that comprises at least color data that defines a set of colors of the media object. The media object may comprise one or more digital media objects that include various image file formats, including but not limited to: JPEG, TIFF. PNG, BPG, BMP, GIF, or Exif. In some embodiments, the first media object includes a logo.

Responsive to receiving the first media object, at operation 404 the media module 304 detects and identifies the set of colors of the first media object. For example, the media module 304 may apply one or more color detection algorithms which identifies pixels in an image that match a specified color or color range.

At operation 406, the media module 304 selects a portion of the set of colors detected in the first media object. For example, the media module 304 may select the most prominent (based on number of pixels) or top 3 most prominent colors in the first media object.

Figure 9:
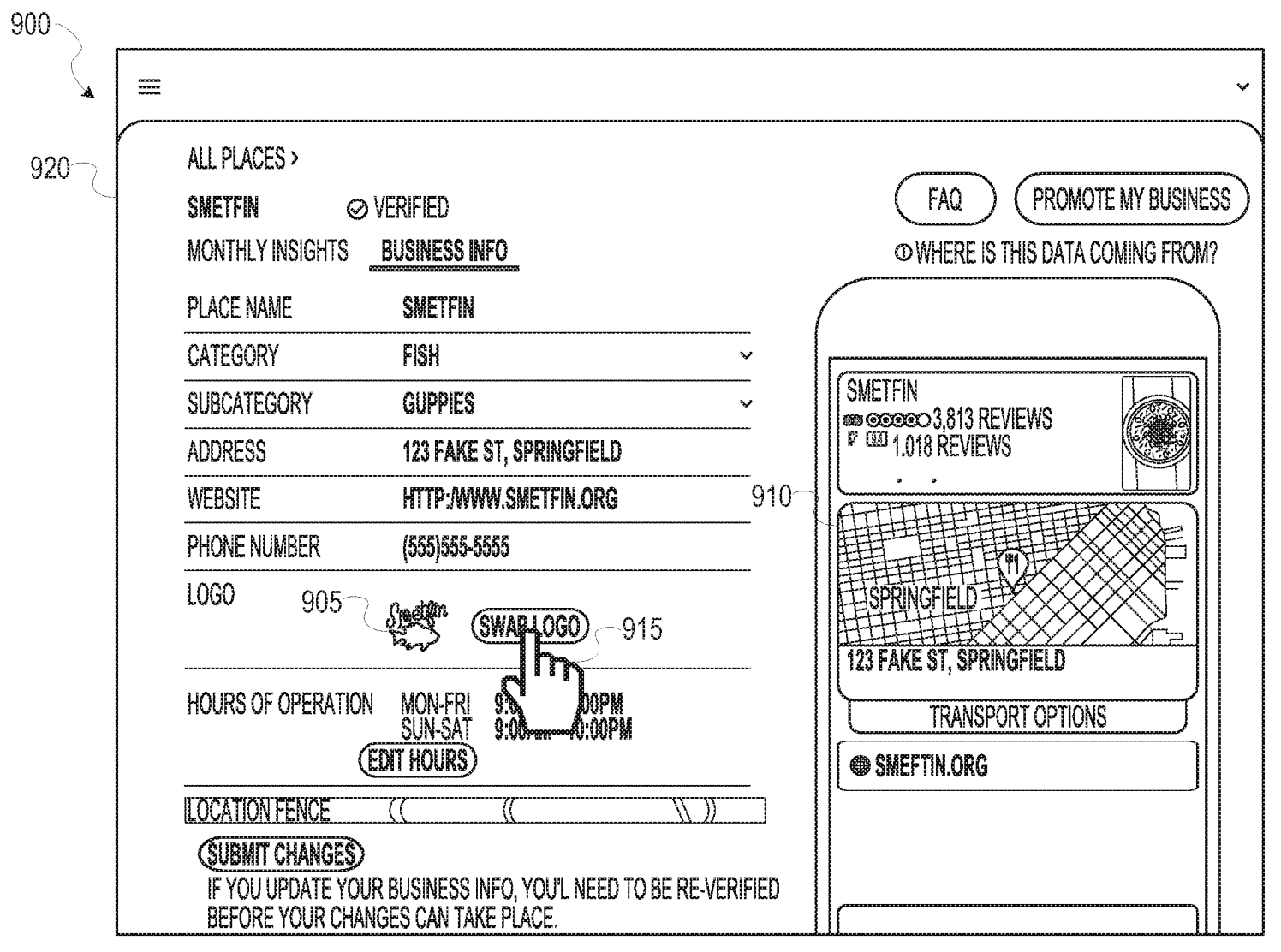

Responsive to the media module 304 selecting the portion of the set of colors, the interface module 306 generates a graphical user interface (GUI) to configure a second media object, wherein the GUI comprises a display of one or more configuration options that include a color selection, and wherein the color selection comprises a presentation of the portion of the set of colors selected by the media module 304. GUI 905 of FIG. 9 depicts such an interface.

FIG. 5 is a flowchart illustrating a method 500 for generating a graphical user interface to configure media content, according to certain example embodiments. Operations of the method 500 may be performed by the modules described above with respect to FIG. 3. As shown in FIG. 5, the method 500 includes one or more operations 502, 504, and 506 that may be performed as a part of (e.g., a subroutine) operation 406 of the method 400, as depicted in FIG. 4.

At operation 502, responsive to the media module 304 detecting the set of colors of the first media object, as in operation 404 of the method 400, the media module 304 determines pixel counts of each color from among the set of colors that make up the first media object.

At operation 504, the media module 304 ranks each color among the set of colors based on their corresponding pixel counts, and at operation 506, selects a portion of the set of colors based on the ranking. For example, the media module 304 may select the top 10% of colors based on pixel count, or the top 3 colors of the first media object based on their corresponding pixel counts.

FIG. 6 is a flowchart illustrating a method 600 for generating a graphical user interface to configure media content, according to certain example embodiments. Operations of the method 600 may be performed by the modules described above with respect to FIG. 3. As shown in FIG. 6, the method 600 includes one or more operations 602, and 604 that may be performed as a part of (e.g., a subroutine) the method 400, as depicted in FIG. 4.

Responsive to receiving the first media object, at operation 602 the media module 304 identifies one or more fonts depicted in the first media object. For example, the first media object may include a logo that comprises a display of text in one or more fonts. Responsive to receiving the first media object, the media module 304 applies one or more image recognition techniques. For example, in some embodiments, the media module 304 may apply optical character recognition techniques, that utilize optical properties of text characters to identify the one or more fonts of the first media object.

At operation 604, responsive to the media module 304 identifying the one or more fonts of the first media object, the interface module 304 causes display of a text selection menu within the GUI, wherein the text selection menu comprises a list of selectable fonts that include the one or more fonts depicted in the first media object. In some embodiments, the one or more fonts of the first media object may be displayed at a more prominent position in the list of fonts (e.g., the top of the list), or may otherwise be visually distinguished from the other fonts in the list by highlighting, italicizing, bolding, or displaying in a different color.

FIG. 7 is a flowchart illustrating a method 700 for generating a graphical user interface to configure media content, according to certain example embodiments. Operations of the method 700 may be performed by the modules described above with respect to FIG. 3. As shown in FIG. 7, the method 700 includes one or more operations 702, and 704 that may be performed as a part of the method 400, as depicted in FIG. 4.

At operation 702, the interface module 306 receives a selection of a color from among the presentation of the portion of the set of colors. For example, the presentation module 302 may cause display of the interface generated by the interface module 306 at a client device 102. A user operating the client device 102 may provide one or more inputs selecting a color from among the portion of the set of colors.

At operation 704, responsive to the interface module 306 receiving the selection of the color from among the portion of the set of colors depicted in the color selection presented in the GUI, the media module 304 configures one or more media objects, including a second media object, based on the selection. For example, the second media object may include a templatized media object that comprises a set of graphical elements. Responsive to receiving the selection of the color, the media module 304 configures the one or more media objects including the second media object based on the selection.

FIG. 8 is a flowchart illustrating a method 800 for generating a graphical user interface to configure media content, according to certain example embodiments. Operations of the method 800 may be performed by the modules described above with respect to FIG. 3. As shown in FIG. 8, the method 800 includes one or more operations 802, 804, 806, and 808 that may be performed as a part of the method 400, as depicted in FIG. 4.

At operation 802, the media module 304 determines a location associated with the first media object. For example, responsive to receiving the first media object, the media module 304 may determine the location associated with the first media object based on a user account of a user that uploaded the first media object to the media configuration system 124, or may prompt the user by causing the presentation module 302 to cause display of a request to identify a location.

At operation 804, responsive to the media module 304 determining the location associated with the first media object, the interface module 306 cause display of a map image that includes a depiction of the location associated with the first media object. For example, the map image may depict a region that includes the location.

At operation 806, the interface module 306 receives a user input selecting an area within the region depicted in the map image. For example, a user may draw a closed shape on the map image that defines an area within the map image, or in further embodiments may provide an input that defines a radius of a circle with the location associated with the first media item as the center of the circle. At operation 808, the geo-fence module 308 assigns the second media object to a geo-fence that encompasses the area defined by the input.

FIG. 9 is a diagram 900 illustrating an interface 920 to configure media content, according to certain example embodiments. As seen in the diagram 900, a user may provide an input via a cursor 915 to upload a logo 905 (e.g., a first media object) into the interface 920, wherein the logo 905 comprises a set of colors and text data that define a font of the logo 905.

In some embodiments, and as discussed in the method 800 of FIG. 8, a user may associate a location with media content. In response to determining a location of the media content, the media configuration system 124 may cause display of a map image 910 that depicts a region that includes the location associated with the media content. A user may provide one or more inputs into the map image 910 that identify an area within the region in order to assign media content to one or more geo-fences. For example, the user may draw a closed shape within the map image 910, or may provide an input selecting a point and defining a radius.

Figure 10:
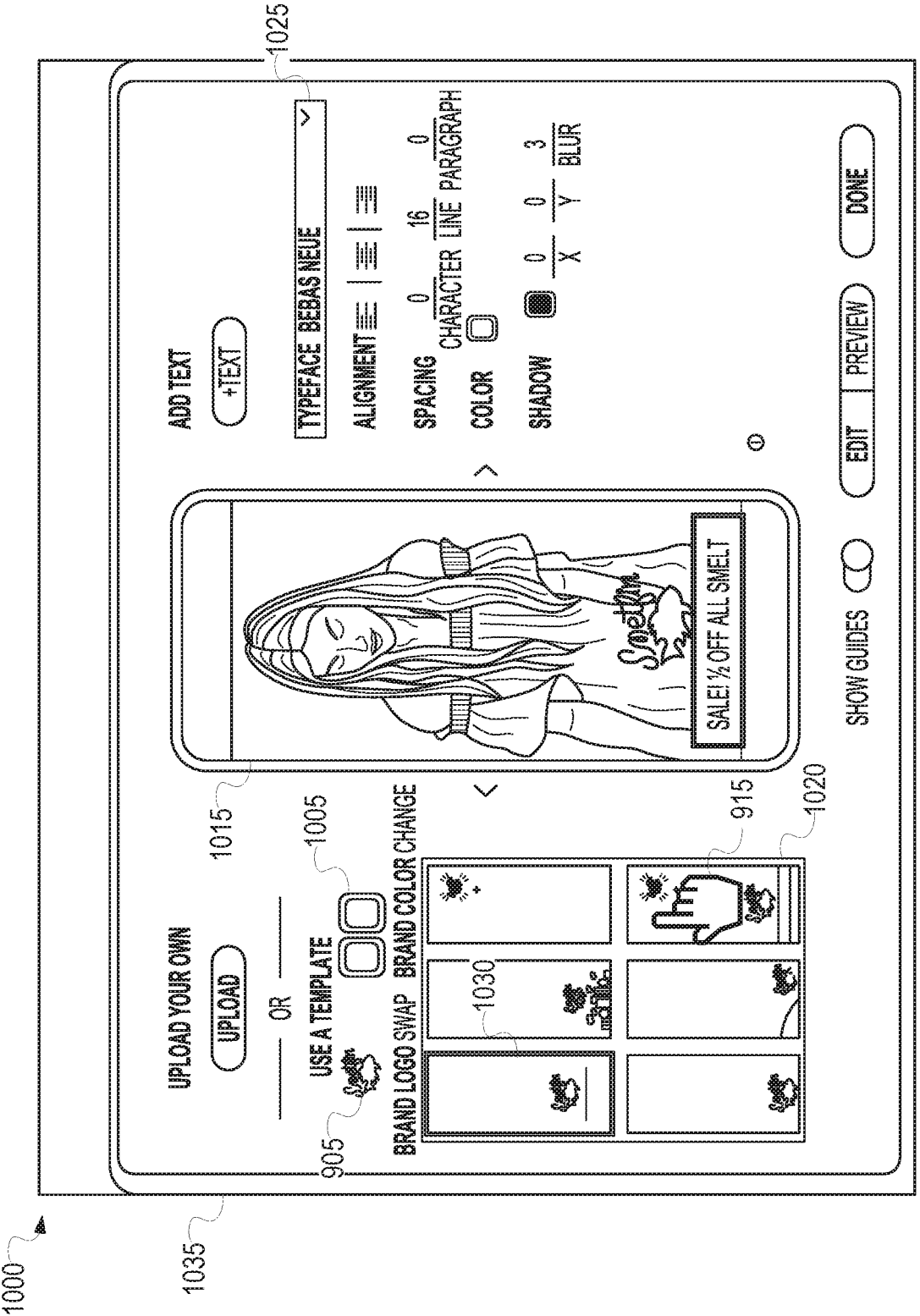
FIG. 10 is an interface diagram depicting a graphical user interface to configure media content, according to certain example embodiments.

In some embodiments, responsive to receiving the logo 905 through the interface 920, the media configuration system generates and causes display of the interface 1035, as depicted in FIG. 10.

FIG. 9 is a diagram 1000 illustrating an interface 1035 to configure media content, according to certain example embodiments. As seen in the diagram 1000, the media configuration system 124 may receive a logo 905 via a user input, and in response perform the various operations of the methods 400, 500, and 600, as depicted in FIGS. 4, 5, and 6, in order to configure the interface 1035.

Responsive to receiving the logo 905, the media configuration system 124 detects one or more colors and fonts depicted in the logo 905, and causes display of interface elements to configure a second media object, based on the one or more colors and fonts. For example, the media configuration system may cause display of the color selection 1005, wherein the color selection 1005 comprises a display of the one or more colors depicted in the logo 905, and the font selection 1025, wherein the font selection 1025 comprises a display of the fonts detected in the logo 905.

For example, as discussed in the method 400 of FIG. 4, and the method 600 of FIG. 6, responsive to detecting the set of colors and fonts depicted in the logo (e.g., the logo 905), the media configuration system 124 causes display of the color selection 1005, and font selection 1025, wherein the color selection 1005 comprises the portion of the set of colors depicted in the logo 905, and the font selection 1025 comprises a list of the fonts detected in the logo 905. While the color selection 1005 is depicted as being two colors in FIG. 10, and similarly the font selection 1025 depicts one font, the media configuration system 124 is not limited to such embodiments. The number of colors and fonts displayed within the interface 1035 may vary based on attributes of the logo 905 itself, such as number of colors and fonts present in the logo 905. For example, upon detecting 10 color in the logo 905, the media configuration system 124 may rank the 10 colors, and display all 10 in a sort order based on the ranking, or may display a portion of the 10 colors based on the ranking.

In some embodiments, the media configuration system 124 causes display of a presentation of a set of media templates 1020, wherein each media template within the presentation of the set of templates 1020 is configured based on the one or more colors and fonts detected in the logo 905. For example, media template 1030 comprises a display of the logo 905, and graphical and text elements at positions within the media template 1030, wherein the positions are based on an associated media layout of the media template 1030.

In response to receiving a selection of a media template (e.g., media template 1030) from among the set of media templates 1020, the media configuration system 124 causes display of the media presentation 1015, wherein the media presentation 1015 comprises a display of the media template 1030, overlaid upon an image or other media item selected by the user (e.g., a picture, video, gif).

Software Architecture

Figure 11:
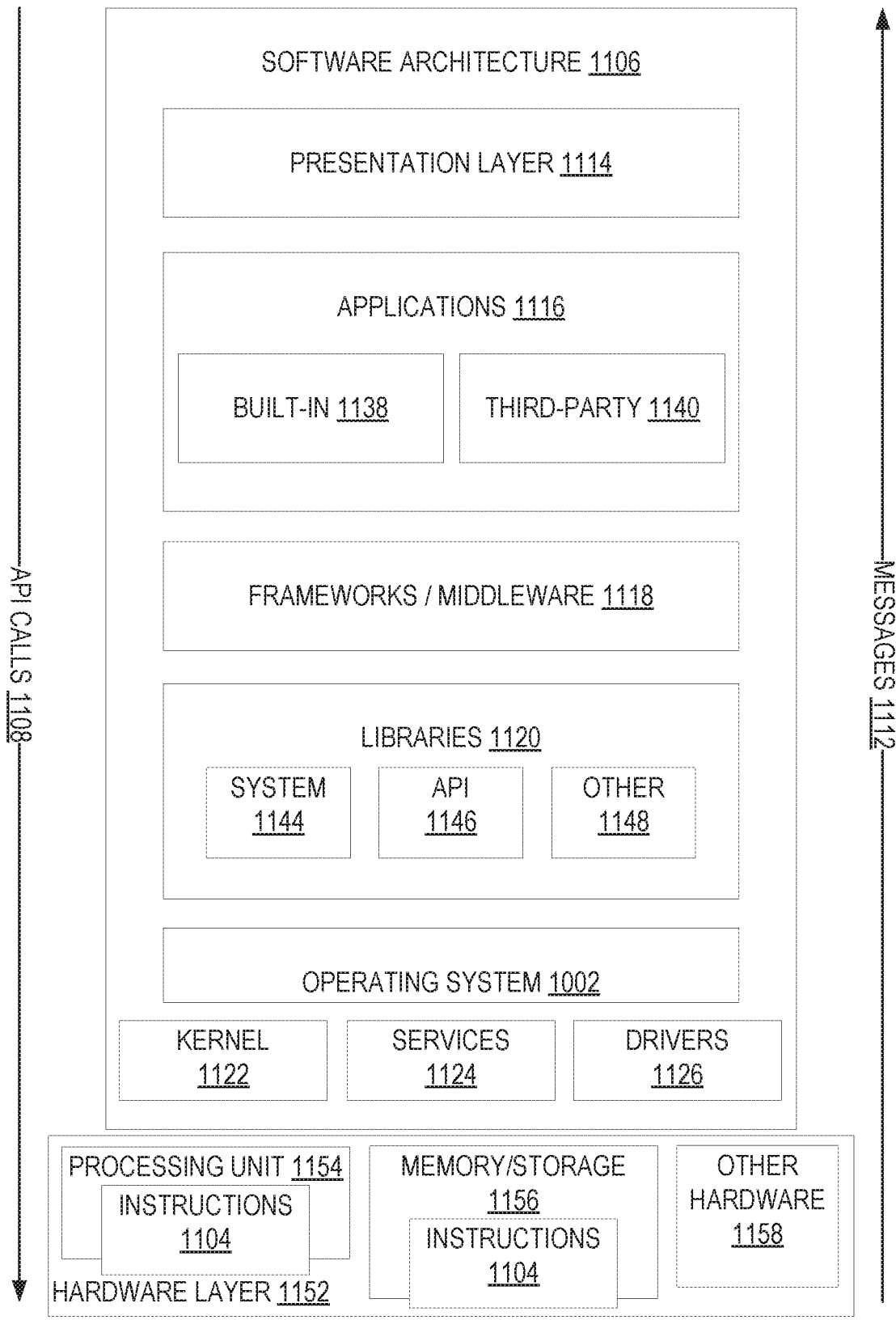
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as the machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264. MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (.SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
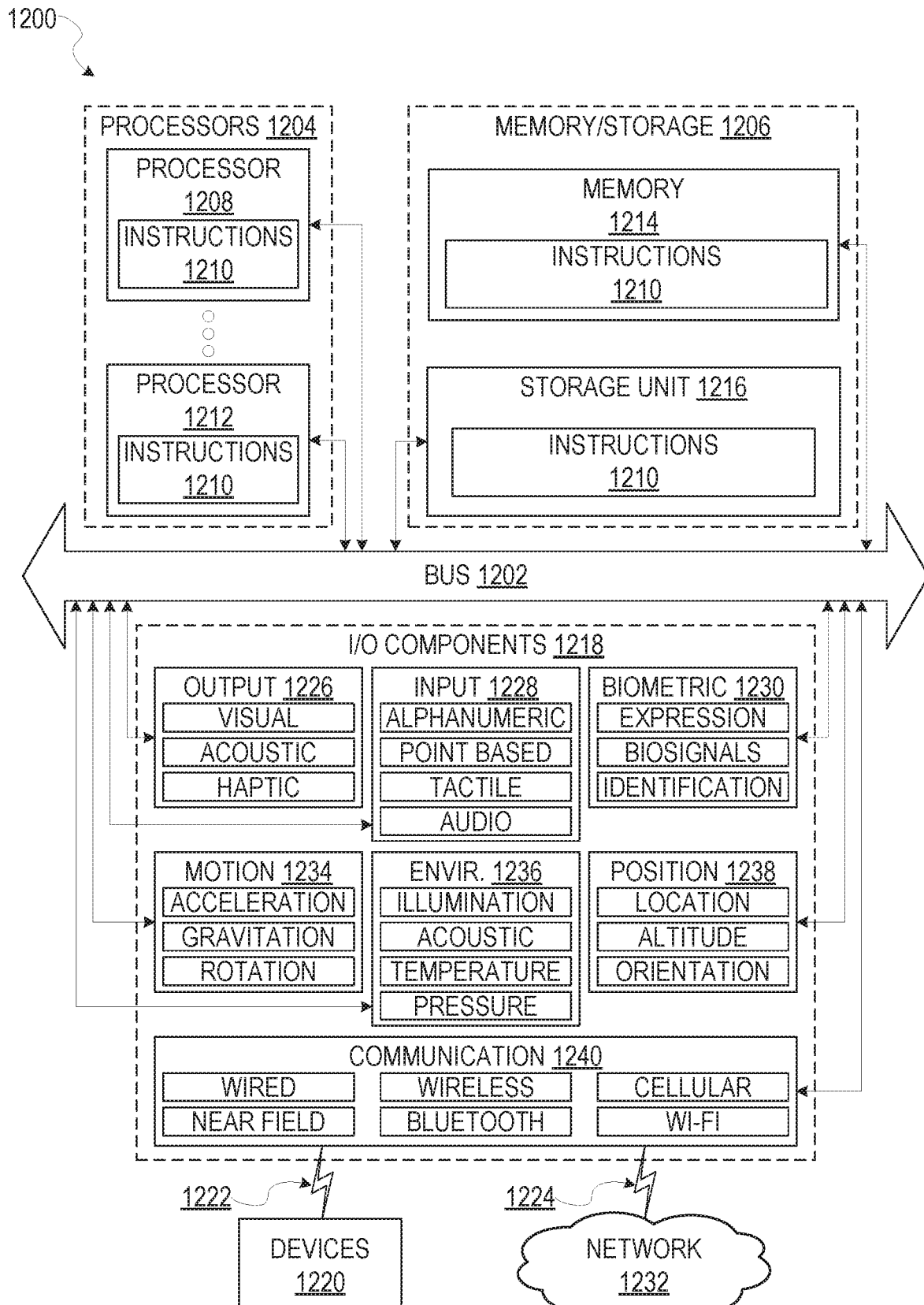
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands". "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   receiving a first media object from a user account, the first media object comprising features that include color data that defines a set of colors of the media object, and text data that comprises a font;
   detecting the set of colors of the first media object responsive to the receiving the first media object;
   selecting a portion of the set of colors of the first media object, a quantity of the portion of the set of colors based on a number of colors among the set of colors;
   identifying the font of the text data of the first media object;
   generating an interface to configure a second media object that includes a map image that includes a depiction of a geographic location associated with the user account, the interface comprising a display of one or more configuration options that include a color selection menu and a font selection menu, the color selection menu comprising a presentation of the portion of the set of colors, and the font selection menu comprising a list of fonts that includes a display of the font of the media object at a position among the list of fonts, the display of the font being visually distinguished from the list of fonts based on a graphical property of the display of the font;
   receiving an input that selects a location from within the depiction of the geographic location associated with the user account;
   generating the second media object based on one or more selections of the one or more configuration options; and
   assigning the second media object to a geo-fence that encompasses the location selected based on the input.
2. The method of claim 1, wherein the selecting the portion of the set of colors includes:
   ranking the set of colors of the first media object responsive to the detecting the set of colors; and
   selecting the portion of the set of colors based on the ranking.
3. The method of claim 2, wherein the ranking the set of colors of the first media object includes:
   determining a pixel count of each color from among the set of colors; and
   ranking the set of colors based on the pixel count of each color from among the set of colors.
4. The method of claim 1, wherein the second media object includes a filter element to be overlaid upon an image.
5. The method of claim 1, wherein the method further comprises:
   receiving a user input that selects a color from among the presentation of the portion of the set of colors; and
   configuring the second media object based on the color selected by the user input.
6. The method of claim 5, wherein the method further comprises:
   overlaying the second media item on an image.
7. A system comprising:
   a memory; and
   at least one hardware processor coupled to the memory and comprising instructions that causes the system to perform operations comprising:
   receiving a first media object from a user account, the first media object comprising features that include color data that defines a set of colors of the media object, and text data that comprises a font;
   detecting the set of colors of the first media object responsive to the receiving the first media object;
   selecting a portion of the set of colors of the first media object, a quantity of the portion of the set of colors based on a number of colors among the set of colors;
   identifying the font of the text data of the first media object;
   generating an interface to configure a second media object that includes a map image that includes a depiction of a geographic location associated with the user account, the interface comprising a display of one or more configuration options that include a color selection menu and a font selection menu, the color selection menu comprising a presentation of the portion of the set of colors, and the font selection menu comprising a list of fonts that includes a display of the font of the media object at a position among the list of fonts, the display of the font being visually distinguished from the list of fonts based on a graphical property of the display of the font;
   receiving an input that selects a location from within the depiction of the geographic location associated with the user account;
   generating the second media object based on one or more selections of the one or more configuration options; and
   assigning the second media object to a geo-fence that encompasses the location selected based on the input.
8. The system of claim 7, wherein the selecting the portion of the set of colors includes:
   ranking the set of colors of the first media object responsive to the detecting the set of colors; and
   selecting the portion of the set of colors based on the ranking.
9. The system of claim 8, wherein the ranking the set of colors of the first media object includes:
   determining a pixel count of each color from among the set of colors; and ranking the set of colors based on the pixel count of each color from among the set of colors.

10. The system of claim 7, wherein the second media object includes a filter element to be overlaid upon an image.

11. The system of claim 7, wherein the instructions cause the system to perform operations further comprising:
receiving a user input that selects a color from among the presentation of the portion of the set of colors; and
configuring the second media object based on the color selected by the user input.

12. The system of claim 11, wherein the instructions cause the system to perform operations further comprising:
overlaying the second media item on an image.

13. A non-transitory machine-readable storage medium comprising instructions that, when executed by one or more processors of a machine, cause the machine to perform operations comprising:
receiving a first media object from a user account, the first media object comprising features that include color data that defines a set of colors of the media object, and text data that comprises a font;
detecting the set of colors of the first media object responsive to the receiving the first media object;
selecting a portion of the set of colors of the first media object, a quantity of the portion of the set of colors based on a number of colors among the set of colors;
identifying the font of the text data of the first media object;
generating an interface to configure a second media object that includes a map image that includes a depiction of a geographic location associated with the user account, the interface comprising a display of one or more configuration options that include a color selection menu and a font selection menu, the color selection menu comprising a presentation of the portion of the set of colors, and the font selection menu comprising a list of fonts that includes a display of the font of the media object at a position among the list of fonts, the display of the font being visually distinguished from the list of fonts based on a graphical property of the display of the font;
receiving an input that selects a location from within the depiction of the geographic location associated with the user account;
generating the second media object based on one or more selections of the one or more configuration options; and
assigning the second media object to a geo-fence that encompasses the location selected based on the input.

14. The non-transitory machine-readable storage medium of claim 13, wherein the selecting the portion of the set of colors includes:
ranking the set of colors of the first media object responsive to the detecting the set of colors; and
selecting the portion of the set of colors based on the ranking.

15. The non-transitory machine-readable storage medium of claim 14, wherein the ranking the set of colors of the first media object includes:
determining a pixel count of each color from among the set of colors; and
ranking the set of colors based on the pixel count of each color from among the set of colors.

* * * * *